United States Patent
Thesling

(10) Patent No.: US 9,755,757 B2
(45) Date of Patent: *Sep. 5, 2017

(54) HIGH DATA RATE OPTICAL TRANSPORT NETWORK USING 8-PSK

(71) Applicant: ViaSat, Inc., Carlsbad, CA (US)

(72) Inventor: William Thesling, Hudson, OH (US)

(73) Assignee: ViaSat, Inc., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/747,990

(22) Filed: Jun. 23, 2015

(65) Prior Publication Data

US 2016/0080091 A1    Mar. 17, 2016

Related U.S. Application Data

(63) Continuation of application No. 13/835,119, filed on Mar. 15, 2013, now Pat. No. 9,094,132.

(60) Provisional application No. 61/755,902, filed on Jan. 23, 2013.

(51) Int. Cl.
| H04B 10/00 | (2013.01) |
| H04B 10/12 | (2006.01) |
| H04B 10/06 | (2006.01) |
| H04B 10/556 | (2013.01) |
| H04B 10/60 | (2013.01) |

(52) U.S. Cl.
CPC ......... *H04B 10/5561* (2013.01); *H04B 10/60* (2013.01)

(58) Field of Classification Search
USPC ........................................ 398/140, 183, 208
See application file for complete search history.

(56) References Cited

U.S. PATENT DOCUMENTS

| | | | |
|---|---|---|---|
| 6,603,822 B2 | 8/2003 | Brede et al. | |
| 6,628,723 B1 | 9/2003 | Gerlach et al. | |
| 6,633,856 B2 | 10/2003 | Richardson et al. | |
| 6,731,679 B1 * | 5/2004 | Takayama | H03M 5/02 375/223 |
| 6,829,308 B2 | 12/2004 | Eroz et al. | |

(Continued)

FOREIGN PATENT DOCUMENTS

| WO | WO-2008063183 A2 | 5/2008 |
| WO | WO-2010008949 A2 | 1/2010 |

*Primary Examiner* — David Payne
*Assistant Examiner* — Pranesh Barua
(74) *Attorney, Agent, or Firm* — Holland & Hart LLP

(57) ABSTRACT

Methods, systems, and devices are described for modulating data for optical transmissions and demodulating data from optical transmissions. During modulation, bits are mapped to symbols using an 8-ary modulation scheme. The modulation scheme may be based on 8 Phase Shift Keying (8-PSK), Dual Polarization 8-PSK, or 7-1 PSK for which one of the symbols is located at or near the origin of the constellation. Streams with the symbol-mapped bits are modulated onto a waveform in the digital domain that is converted into a waveform in the analog domain before is output for conversion to an optical signal. The streams may be filtered at baseband with at least one discrete pulse-shaping filter. During demodulation, pulse-shaped data received from an optical signal and comprising symbol-mapped bits based on the 8-ary modulation scheme is sampled. The sampled data is filtered with at least one discrete pulse-shaping filter, and then equalized and demodulated.

26 Claims, 13 Drawing Sheets

(56) References Cited

U.S. PATENT DOCUMENTS

| | | |
|---|---|---|
| 7,127,659 B2 | 10/2006 | Richardson et al. |
| 7,281,192 B2 | 10/2007 | Shen et al. |
| 7,296,208 B2 | 11/2007 | Sun et al. |
| 7,352,824 B2 | 4/2008 | Vrazel et al. |
| 7,382,984 B2 | 6/2008 | McNicol et al. |
| 7,395,487 B2 | 7/2008 | Tran et al. |
| 7,418,212 B1 | 8/2008 | Bontu |
| 7,457,367 B2 | 11/2008 | Farhang-Boroujeny et al. |
| 7,500,172 B2 | 3/2009 | Shen et al. |
| 7,522,841 B2 | 4/2009 | Bontu et al. |
| 7,558,479 B1 | 7/2009 | Robinson |
| 7,587,659 B2 | 9/2009 | Tran et al. |
| 7,636,525 B1 | 12/2009 | Bontu et al. |
| 7,640,486 B2 | 12/2009 | Dottling et al. |
| 7,701,842 B2 | 4/2010 | Roberts et al. |
| 7,760,880 B2 | 7/2010 | Dave et al. |
| 7,770,090 B1 | 8/2010 | Kons et al. |
| 7,813,438 B2 | 10/2010 | Farhang-Boroujeny et al. |
| 7,848,440 B2 | 12/2010 | Farhang Boroujeny et al. |
| 7,991,300 B2 | 8/2011 | Heffner et al. |
| 8,023,402 B2 | 9/2011 | Roberts et al. |
| 8,028,216 B1 | 9/2011 | Yeo et al. |
| 8,045,604 B2 | 10/2011 | Farhang-Boroujeny et al. |
| 8,068,457 B2 * | 11/2011 | Pi .................... H04B 7/0417 370/235 |
| 8,145,066 B2 | 3/2012 | Painchaud et al. |
| 8,156,400 B1 | 4/2012 | Yeo et al. |
| 8,229,303 B1 | 7/2012 | Lindsay |
| 8,244,141 B2 | 8/2012 | Fu et al. |
| 8,255,764 B1 | 8/2012 | Yeo et al. |
| 8,255,765 B1 | 8/2012 | Yeo et al. |
| 8,261,166 B2 | 9/2012 | Ulriksson |
| 8,566,668 B1 | 10/2013 | Dave et al. |
| 8,930,789 B1 | 1/2015 | Dave et al. |
| 8,953,951 B1 * | 2/2015 | Thomas .......... H04B 10/25133 398/202 |
| 2002/0024694 A1 | 2/2002 | Newell et al. |
| 2002/0098795 A1 | 7/2002 | Brede et al. |
| 2002/0167703 A1 | 11/2002 | Merritt |
| 2003/0023917 A1 | 1/2003 | Richardson et al. |
| 2003/0033575 A1 | 2/2003 | Richardson et al. |
| 2004/0067064 A1 | 4/2004 | McNicol et al. |
| 2005/0005231 A1 | 1/2005 | Sun et al. |
| 2005/0204271 A1 | 9/2005 | Sharon et al. |
| 2006/0024062 A1 | 2/2006 | Jakober et al. |
| 2006/0067432 A1 | 3/2006 | Thesling et al. |
| 2006/0078336 A1 | 4/2006 | McNicol et al. |
| 2006/0107181 A1 | 5/2006 | Dave et al. |
| 2007/0206963 A1 * | 9/2007 | Koc ..................... H04B 10/61 398/202 |
| 2008/0019703 A1 | 1/2008 | Burchfiel |
| 2008/0104474 A1 | 5/2008 | Gao et al. |
| 2008/0266014 A1 * | 10/2008 | Ma ........................ H03C 3/40 332/103 |
| 2009/0129787 A1 | 5/2009 | Li et al. |
| 2009/0136238 A1 | 5/2009 | Gill et al. |
| 2009/0201796 A1 | 8/2009 | Roberts et al. |
| 2009/0257755 A1 * | 10/2009 | Buelow .............. H04B 10/505 398/184 |
| 2010/0014873 A1 | 1/2010 | Bulow |
| 2010/0040170 A1 * | 2/2010 | Qu ........................ H04L 27/02 375/298 |
| 2010/0142952 A1 | 6/2010 | Qian et al. |
| 2011/0047442 A1 | 2/2011 | Dave et al. |
| 2011/0052215 A1 * | 3/2011 | Zhou ............... H04B 10/25133 398/208 |
| 2011/0053546 A1 | 3/2011 | Hess et al. |
| 2011/0122970 A1 * | 5/2011 | Chappaz ............ H04L 27/2017 375/308 |
| 2011/0255870 A1 | 10/2011 | Grigoryan et al. |
| 2012/0082459 A1 | 4/2012 | Wu et al. |
| 2012/0082460 A1 | 4/2012 | Wu et al. |
| 2012/0082466 A1 | 4/2012 | Wu et al. |
| 2012/0134665 A1 | 5/2012 | Lindsay |
| 2012/0141135 A1 * | 6/2012 | Yang .................... H04B 10/516 398/140 |
| 2012/0189319 A1 | 7/2012 | Mo et al. |
| 2012/0189324 A1 | 7/2012 | Mo et al. |
| 2012/0251119 A1 | 10/2012 | McNicol et al. |
| 2012/0328305 A1 | 12/2012 | Rahn et al. |
| 2013/0259101 A1 | 10/2013 | Earnshaw et al. |
| 2013/0336649 A1 * | 12/2013 | Essiambre ............ H04L 27/06 398/27 |
| 2014/0023133 A1 | 1/2014 | Foggi et al. |
| 2014/0059403 A1 | 2/2014 | Sommer et al. |
| 2014/0075258 A1 | 3/2014 | Miller et al. |
| 2014/0099116 A1 | 4/2014 | Bai et al. |
| 2014/0153625 A1 | 6/2014 | Vojcic et al. |
| 2014/0211838 A1 | 7/2014 | Yu et al. |

* cited by examiner

HIGH DATA RATE OPTICAL TRANSPORT NETWORK USING 8-PSK

CROSS REFERENCES

The present application is a continuation of U.S. patent application Ser. No. 13/835,119 filed on Mar. 15, 2013, entitled, "HIGH DATA RATE OPTICAL TRANSPORT NETWORK USING 8-PSK", which claims the benefit of U.S. Provisional Patent Application Ser. No. 61/755,902 filed on Jan. 23, 2013, entitled "HIGH DATA RATE OPTICAL TRANSPORT NETWORK USING 8-PSK", all of which are incorporated herein by reference in its entirety.

BACKGROUND

The present disclosure relates to systems and methods for digital modulation and demodulation of data in a fiber optic communications system.

Fiber optic channels in network communications systems are well known and are considered effective for data transmission, allowing relatively high bandwidth data communication. Optical fiber used in such channels is flexible and can be bundled as cables, and is generally considered to be appropriate for long-distance communications because light propagates through the fiber with little attenuation compared to electrical cables. Typical present day commercial optical fiber systems transmit data at rates of 10 or 40 Gigabit-per-second. Each fiber can carry multiple independent channels and each of the channels uses a different wavelength of light. This technique, which is known as wavelength-division multiplexing or WDM, enhances the net data rate of an optical fiber. For some dense WDM systems, for example, there may be as many as 80 independent channels with each channel having a 50 Gigahertz channel spacing.

As more capacity is continually desired for networks, a demand for increased data transmission rates exists. As data rates increase in fiber optic systems, however, various optical phenomena begin to manifest and act to limit data transmission rates. Moreover, non-linearities and phase noise issues can affect the performance of certain modulation schemes at the higher data transmission rates.

SUMMARY

Methods, systems, and devices are described for modulating data for optical transmissions and for demodulating data from optical transmissions.

In a first set of embodiments, a method of modulating data for optical transmissions includes mapping bits to symbols using an 8-ary modulation scheme. One or more streams including the symbol-mapped bits are modulated onto a waveform in the digital domain. The waveform in the digital domain is converted to a waveform in the analog domain. The waveform in the analog domain is output for conversion to an optical signal.

In a second set of embodiments, a transmitter device includes a mapper module, a modulation module, and a digital-to-analog converter (DAC) module. The mapper module is configured to map bits to symbols using an 8-ary modulation scheme. The modulation module is configured to modulate one or more streams including the symbol-mapped bits onto a waveform in the digital domain. The DAC module is configured to convert the waveform in the digital domain to a waveform in the analog domain and to output the waveform in the analog domain for conversion to a radiated electromagnetic signal.

In a third set of embodiments, a system for modulating data for optical transmissions includes means for mapping bits to symbols using an 8-ary modulation scheme, means for modulating one or more streams that include the symbol-mapped bits onto a waveform in the digital domain, means for converting the waveform in the digital domain to a waveform in the analog domain, and means for outputting the converted waveform in the analog domain for conversion to an optical signal.

In a fourth set of embodiments, a method of demodulating data from optical transmissions includes sampling pulse-shaped data received from an optical signal. The pulse-shaped data includes symbol-mapped bits based on an 8-ary modulation scheme and the optical signal is an optical conversion of a waveform in the analog domain modulated with the pulse-shaped data. The method further includes filtering the sampled pulse-shaped data with at least one discrete pulse-shaping filter, equalizing the filtered data, and demodulating one or more streams that include the equalized data.

In a fifth set of embodiments, an optical modem apparatus includes an transmitter and an receiver. The transmitter is configured to map bits to symbols using an 8-ary modulation scheme. The transmitter is also configured to modulate one or more streams that include the symbol-mapped bits onto a waveform in the digital domain and to convert the waveform in the digital domain to a waveform in the analog domain for conversion to a first optical signal. The receiver is configured to sample pulse-shaped data received from a second optical signal. The pulse-shaped data that is received includes symbol-mapped bits based on the 8-ary modulation scheme. The receiver is also configured to demodulate bits from symbols recovered from the sampled pulse-shaped data.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
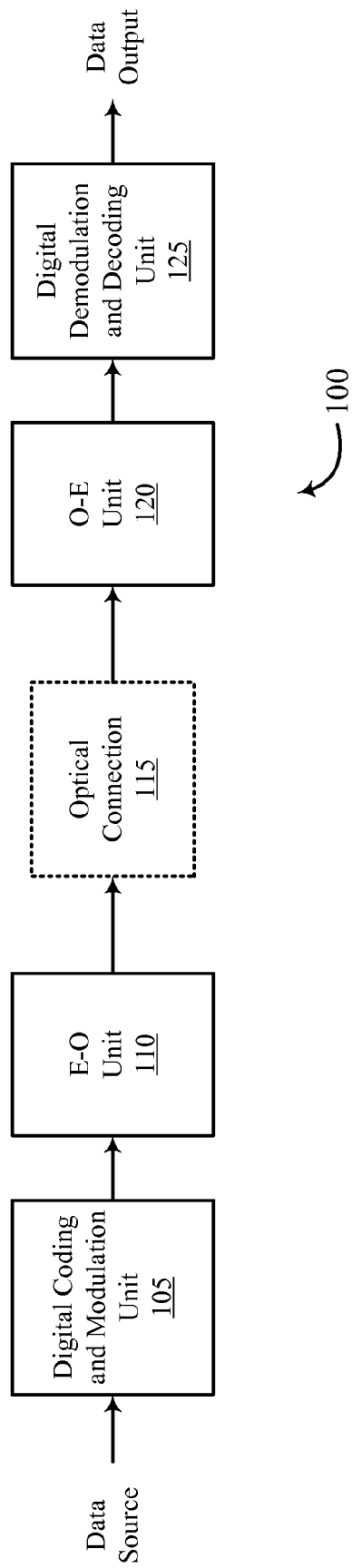
FIG. 1 is a block diagram of an example of an optical communication system including components configured according to various embodiments of the principles described herein.

Methods, systems, and devices are described for modulating data for optical transmissions and for demodulating data from optical transmissions. In some embodiments, modulating data for optical transmissions includes mapping bits to symbols using an 8-ary modulation scheme. One or more streams including the symbol-mapped bits are modulated onto a waveform in the digital domain, which in turn is converted to a waveform in the analog domain that is output for conversion to an optical signal. In other embodiments, demodulating data from optical transmissions includes sampling pulse-shaped data received from an optical signal. The pulse-shaped data includes symbol-mapped bits based on an 8-ary modulation scheme and the optical signal is an optical conversion of a waveform in the analog domain modulated with the pulse-shaped data. Demodulating data from optical transmissions may also include filtering the sampled pulse-shaped data with at least one discrete pulse-shaping filter, equalizing the filtered data, and demodulating one or more streams that include the equalized data.

Optical transport networks (OTNs) that support data transmission rates of 100 Gigabit-per-second (Gbps) or higher, including 200 Gbps and even 1 Terabit-per-second (Tbps), may be achieved by using 8-ary modulation schemes such as 8 Phase-Shift Keying (8-PSK), Dual Polarization 8-PSK (DP8-PSK), and different types of 7-1 PSK, for example. By using high-speed digital-to-analog converters (DACs) on the transmit side of a system based on an 8-ary modulation scheme, well-filtered waveforms may be generated that have a larger bandwidth than that produced by higher-order modulation schemes but within the 50 Gigahertz (GHz) channel spacing of typical wavelength-division multiplexing (WDM) systems. With the additional pre-channel bandwidth produced by 8-ary modulation schemes that use high-speed DACs on the transmit side, OTNs may provide higher data transmission rates without the complexity, size, cost, and power consumption associated with higher-order modulation schemes (e.g., 16-ary). Additionally, OTN solutions based on 8-ary modulation schemes that use high-speed DACs on the transmit side may provide an improved gain performance (e.g., >1 dB) compared to alternative solutions based on higher-order modulation schemes.

In OTN solutions that are based on 8-ary modulation schemes that use high-speed DACs on the transmit side, pulse-shaping filtering may be applied to the data during modulation and demodulation to control and adjust the bandwidth of the waveforms and to pre-compensate for non-ideal conditions occurring during the modulation, transmission, and demodulation of the data. For example, a pulse-shaping filter may be tuned to pre-compensate for predicted optical non-idealities, such as chromatic dispersion, that may occur in an optical fiber at a modulator.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Systems, devices, methods, and software are described for an optical communication system that uses fiber optic cables as a data transmission medium or path. An example of an optical data transport system 100 is illustrated in FIG. 1. In the present example, the optical data transport system 100 includes a digital coding and modulation unit 105, an electrical-to-optical (E-O) unit 110, an optical connection 115, an optical-to-electrical (O-E) unit 120, and a digital demodulation and decoding unit 125. Each of these components may be in communication, directly or indirectly.

In one embodiment, the optical data transport system 100 includes a data source that provides data to a digital coding and modulation unit 105. The data source may include any of a number of common data sources, such as a user telecommunications device, a cable operator head-end unit, a telecommunications provider central office, a computer server, or a network attached storage system, to name but a few examples. In many embodiments, the data source generates significant quantities of data to be transported across the optical data transport system 100. In some instances, the transmission data rate across the optical data transport system 100 may be 100 Gbps or higher. For example, the transmission data rate may be 200 Gbps or as high as 1 Tbps.

The digital coding and modulation unit 105 receives this data, and performs framing, forward error correction coding, and modulation functions on the data. These functions may include using an 8-ary modulation scheme such as 8-PSK, DP 8-PSK, or 7-1 PSK, for example. The electrical-to-optical (E-O) unit 110 transforms the data into optical signals, and transmits optical signals containing the data via an optical connection 115. The optical connection 115 may include well known components of such connections, including a fiber optic cable. In some embodiments, the optical connection 115 may include any type of medium or path that enables optical signals, or like signals, to propagate. An optical-to-electrical (O-E) unit 120 receives the optical signal from the optical connection 115, and transforms the data into the electrical domain.

The digital demodulation and decoding unit 125 receives the digitized version of the optical signal and performs demodulation, forward error correction decoding, and de-framing functions on the data from the optical signal. These functions may include using the same 8-ary modulation scheme relied upon by transmit side. The digital demodulation and decoding unit 125 may then output the data (e.g., to a user telecommunications device, a cable operator head-end unit, a telecommunications provider central office, a computer server, or a network attached storage system).

High-speed digital demodulation and decoding units 125 may typically operate at an analog-to-digital converter (ADC) sample rate of at least twice the symbol rate of the optical signal to achieve acceptable performance levels. However, by including pulse-shaping filters in the digital coding and modulation unit 105 and the digital demodulation and decoding unit 125, at least a portion of the functionality of the digital demodulation and decoding unit 125 may be performed using a sampling rate that is closer to the symbol rate of the optical signal, thereby reducing the complexity and power consumption of the digital demodulation and decoding unit 125. Additionally, by using pulse-shaping filters and DACs during modulation, pre-compensation of non-ideal transmission conditions in the optical connection 115 may be performed by circuitry in the digital coding and modulation unit 105. Similarly, by using ADCs and pulse-shaping filters during demodulation, post-compensation of non-ideal transmission conditions in the optical connection 115 may be performed by circuitry in the digital demodulation and decoding unit 125.

Figure 2:
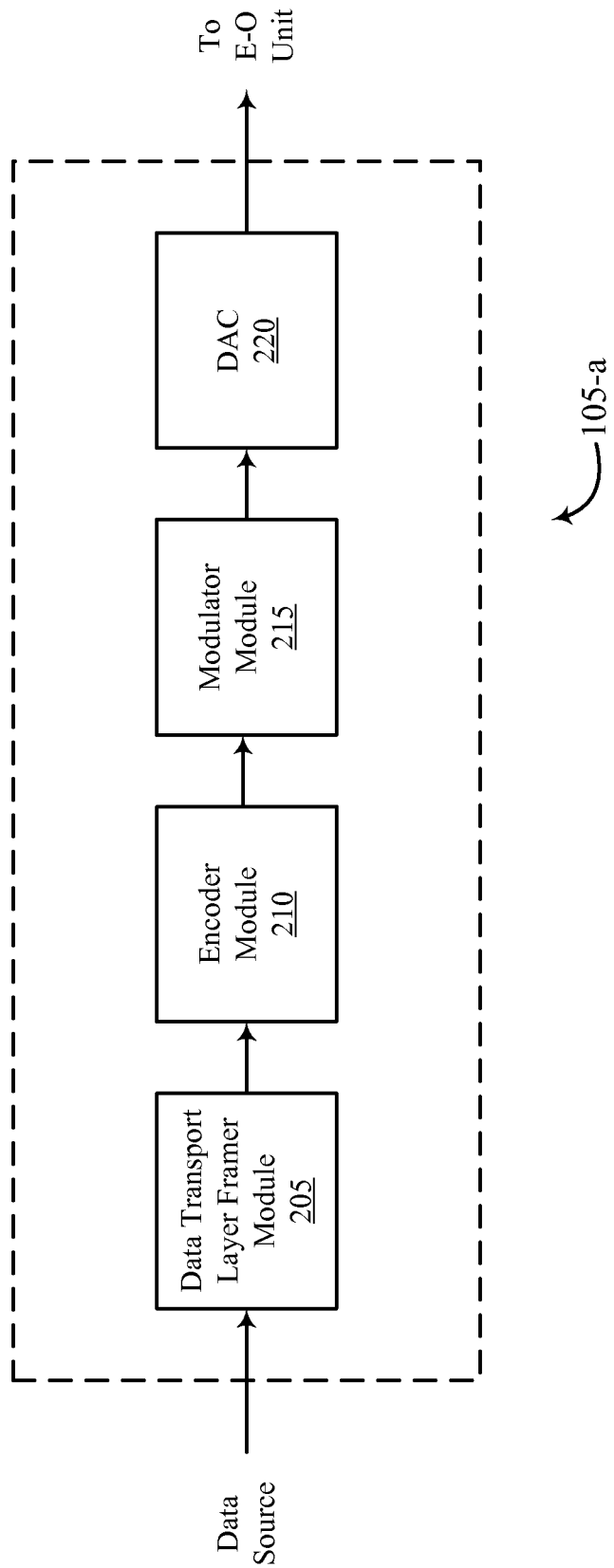
FIG. 2 is a block diagram of an example of a digital coding and modulation module according to various embodiments of the principles described herein.

FIG. 2 illustrates a digital coding and modulation unit 105-a. The digital coding and modulation unit 105-a may be an example of the digital coding and modulation unit 105 described above with reference to FIG. 1. In the illustrated embodiment, the digital coding and modulation unit 105-a includes a data transport layer framer module 205, an encoder module 210, a modulator module 215, and a DAC 220. Each of these components may be in communication, directly or indirectly.

The data transport layer framer module 205 may place the data received from the data source into packet frames for transmission. The packet frames may conform to one of many common protocols for packet frames used in optical communications systems which commonly include a header and a payload, and possibly a trailer, such as a cyclic redundancy check (CRC). As is well understood, the header may be interleaved with the payload during transmission, depending upon the particular protocol being used for optical transmission.

The encoder module 210 may calculate and add forward error correction (FEC) information to the frames of data received from the data transport layer framer module 205. The particular type of FEC information of various embodiments may generally include systematically generated redundant error-correcting code (ECC) data that is transmitted along with the frames. There may be differential encoding used in some embodiments.

The modulator module 215 may perform pulse-shaping and pre-compensation filtering on the frames and FEC information, and modulate the frames and FEC information onto one or more sinusoidal waves generated in the digital domain, and forward the data to the DAC 220. The DAC 220 may convert the digital signal of the modulated data into an analog signal, which may be forwarded to an E-O unit (e.g., E-O unit 110) for conversion from the electrical domain to the optical domain. The DAC 220 may provide filtering that may allow for the bandwidth of the analog signal to be within the 50 GHz channel spacing of WDM systems.

The optical signal from the E-O unit may be transmitted in the optical domain via an 8-ary modulation scheme supported by the modulator module 215. Examples of such schemes include 8-PSK, DP 8-PSK, and 7-1 PSK. The latter modulation scheme, 7-1 PSK, may be based on a constellation diagram in which one symbol is at the origin or offset from the origin of the complex plane and the remaining seven symbols are in their typical locations in the complex plane. These 7-1 PSK modulation schemes may provide for additional phase spacing between some of the symbols. Using an 8-ary modulation scheme may result in optical streams that have in-phase and quadrature components. When the 8-ary modulation scheme supports horizontal (H) and vertical (V) polarizations, the streams may include parallel optical streams such as a horizontal in-phase (HI) stream, a horizontal quadrature (HQ) stream, a vertical in-phase (VI) stream, and a vertical quadrature (VQ) stream.

The optical signal from the E-O unit may have a transmit data rate that is higher than 100 Gbps. In some embodiments, the transmit data rate is about 200 Gbps. For example, for an 8-ary modulation scheme (e.g., 3 bits-per-symbol) with dual polarization and where the symbol rate is 40 GHz (within the 50 GHz channel spacing), the overall data transmission rate is about 240 Gbps (40 GHz×3 bits-per-symbol×2 poles=240 Gbps). If there is a 20% overhead associated with forward error correction, for example, then the usable data transmitted with the 8-ary modulation scheme is about 200 Gbps.

Figure 3:
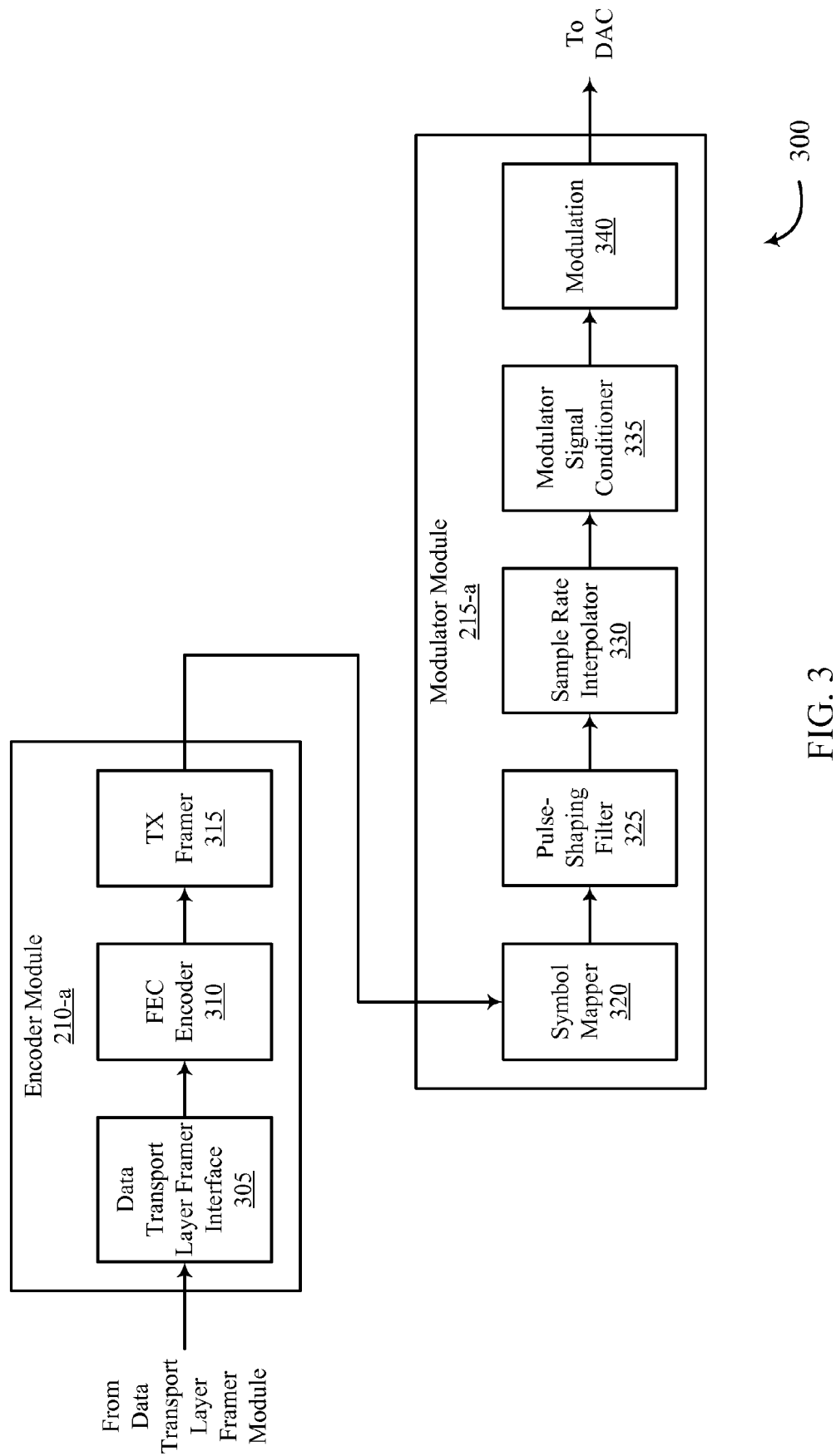
FIG. 3 is a block diagram of an example of an encoder and a modulator in a digital coding and modulation module according to various embodiments of the principles described herein.

FIG. 3 illustrates a system 300 that includes an encoder module 210-a and a modulator module 215-a. Each of these components may be in communication, directly or indirectly. The encoder module 210-a and the modulator module 215-a may be examples, respectively, of the encoder module 210 and the modulator module 215 described above with reference to FIG. 2.

As shown in FIG. 3, the encoder module 210-a includes a data transport layer framer interface module 305, an FEC encoder module 310, and a transmission (TX) framer module 315. The data transport layer framer interface module 305 may receive data to be transmitted from an application or other process external to the encoder 210-a. The data received from the data transport layer may be framed as one or more streams of serial bits for transmission.

The data transport layer framer interface module 305 may forward the data for transmission to the FEC encoder module 310. The FEC encoder module 310 may perform forward error correction on the data to be transmitted. The FEC encoder module 310 may support one or more types of forward error correction techniques. For example, the FEC encoder module 310 may support Turbo Product Code (TPC) encoding, which may be used to increase data reliability and reduce the overall bandwidth for transmission of the data. Another type of forward error correction is Low-Density Parity Check (LDPC), which is based on a linear error correction code. The transmission framer module 315 may receive the FEC encoded bits and frame the bits for symbol mapping at the modulator 215-a.

The modulator module 215-a may include a symbol mapper module 320, a pulse-shaping filter module 325, a sample rate interpolator module 330, a modulator signal conditioner module 335, and a modulation module 340. Each of these components may be in communication, directly or indirectly.

The symbol mapper module 320 may receive the framed, encoded bits from the transmission framer 315 of the encoder and map the bits to modulation symbols according to a particular modulation scheme. For example, the symbol mapper module 320 may support one or more 8-ary modulation schemes such as 8-PSK, DP 8-PSK, and 7-1 PSK, and may map bits to symbols according to one of these modulation schemes.

The symbol-mapped bits may then be received at the pulse-shaping filter module 325 in multiples streams. At the pulse-shaping filter module 325, each of the streams may be filtered in the digital domain with at least one pulse-shaping filter. The at least one pulse-shaping filter may include a finite impulse response (FIR) filter or an infinite impulse response (IIR) filter with adjustable tap coefficients. The at least one pulse-shaping filter may be, for example, a root-raised cosine filter or other known pulse-shaping filter that may reduce or adjust the bandwidth associated with the streams symbol-mapped bits. Additionally or alternatively, each stream of symbol-mapped bits may be filtered using an adjustable time and/or frequency domain filter.

Additionally, the pulse-shaping filter module 325 may filter each stream of symbol-mapped bits to pre-compensate for at least one known or predicted non-ideal transmission condition. The non-ideal transmission condition may occur in the optical space, such as chromatic dispersion and/or timing skew that occurs when an optical signal is transmitted through an optical fiber or other optical medium or path. Additionally or alternatively, the non-ideal transmission condition may occur in the electrical domain. For example, the non-ideal transmission condition may include a non-linear amplifier response at the transmitting or receiving end, or component or channel roll-off that occurs in a DAC, an ADC, or another electrical component.

In certain examples, the non-ideal transmission condition may be predicted or determined based on measurements taken at one or more points in the transmitter, the signal path, or the receiver. For example, a receiver may measure a certain degree of chromatic dispersion in a received optical signal and communicate with the transmitter to provide data about the measured chromatic dispersion. Additionally or alternatively, the non-ideal transmission condition may be modeled or estimated based on known properties of electrical and/or optical components in the signal path between the transmitter and the receiver.

The pulse-shaping filter module 325 may pre-compensate for the at least one identified non-ideal transmission condition by calculating or estimating an effect of the non-ideal transmission condition on the transmitted optical signal and filtering the streams of symbol-mapped bits to at least partially reverse, lessen, or compensate the effect of the non-ideal transmission condition(s). In certain examples, separate filters may be used to create the root-raised cosine pulse shape and to pre-compensate for non-ideal transmission conditions. Alternatively, a single digital filter may be used for each stream to both shape the pulses into the desired root-raised cosine shape and to make further adjustments to the shape of the pulses to pre-compensate for the non-ideal transmission conditions.

The pulse-shaping filter(s) of the pulse-shaping filter module 325 may be dynamically tunable through the use of changeable filter tap coefficients. In certain examples, the type of filter itself may be dynamically changed to pre-compensate for a non-ideal transmission condition. For example, one or more filters in the pulse-shaping filter module 325 may be dynamically changed from a root-raised cosine filter to a simple raised-cosine filter, a Gaussian filter, or a sinc-shaped filter if such a change would more effectively pre-compensate for a known or predicted non-ideal transmission condition.

Additionally, in certain examples it may be possible to dynamically customize the filtering performed at each stream of symbol-mapped bits. For example, when the symbol mapper module 320 produces HI, HQ, VI, and VQ streams, it may be determined that an optical transmission path introduces a timing skew between the HI and HQ streams, but not between the VI and VQ streams. In this example, the properties of a pulse-shaping filter associated with the HI and/or HQ streams may be adjusted to pre-compensate for the timing skew without making adjustments to the VI and VQ streams.

The output of the pulse-shaping filter module 325 may be received at the sample rate interpolator module 330. The sample rate interpolator module 330 may add bits to each of the streams of symbol-mapped bits to increase the sample rate of each stream, for example, to twice the symbol rate. The modulator signal conditioner module 335 may receive the output of the sample rate interpolator module 330 and may perform additional filtering on each of the streams in the digital domain. For example, the modulator signal conditioner module 335 may perform direct current (DC) bias compensation. Additionally or alternatively, the modulator signal conditioner module 335 may filter the streams to compensate for amplitude/amplitude (AM/AM) non-linearity caused by driving amplifiers into saturation and/or amplitude/phase non-linearity. The modulator signal conditioner module 335 may include tunable digital domain filters that may be dynamically adjusted as changes in DC bias or amplifier non-linearity are detected, predicted, or determined. In some embodiments, some or all of the functionality of the modulator signal conditioner module 335 is performed at the phase-shaping filter module 325.

The output of the modulator signal conditioner module 335 may be received by the modulation module 340. The modulation module 340 may generate sinusoidal waves or waveforms in the digital domain and modulate the filtered, up-sampled, and conditioned symbol-mapped bits that are output by the modulator signal conditioner module 335 onto the sinusoidal waveforms. In certain examples, the sinusoidal waveforms may have a relatively low intermediate frequency.

The modulated waves may be output by the modulation module 340 to one or more DACs (not shown), which may convert each modulated carrier wave from the digital domain to the analog domain. The waveforms in the analog domain that are output by the DAC(s) may undergo amplification and additional conditioning. When H and V polarizations are used, the amplified and conditioned waveforms may be converted into separate H and V optical signals at an E-O unit (not shown).

Figure 4:
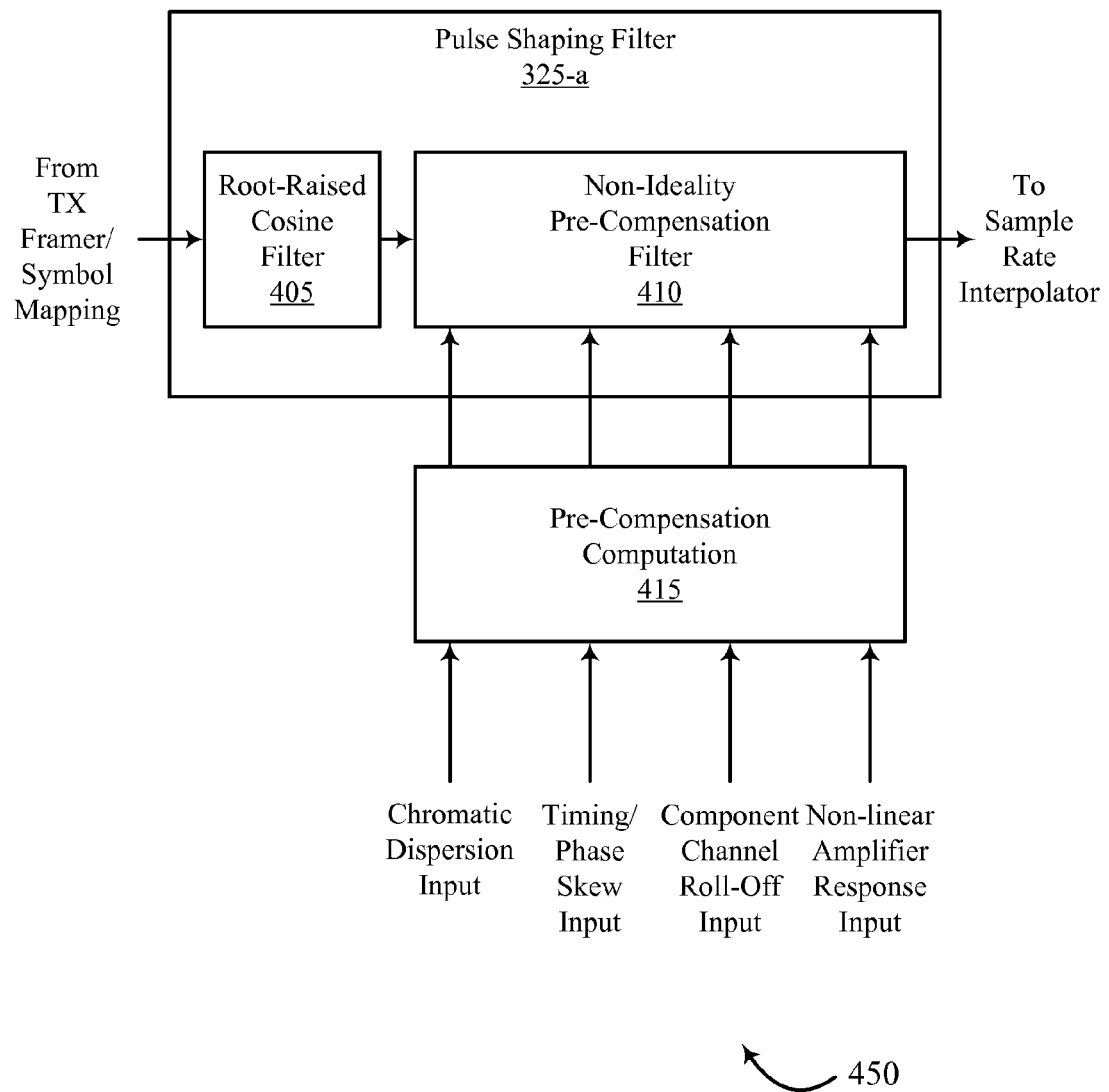
FIG. 4 is block diagram of an example of a pulse-shaping filter module according to various embodiments of the principles described herein.

FIG. 4, a system 450 is shown in which a pulse-shaping filter module 325-a is coupled to a pre-compensation computation module 415. The pulse-shaping filter module 325-a may be an example of the pulse-shaping filter module 325 described above with reference to FIG. 3.

The pulse-shaping filter module 325-a may include a root-raised cosine filter module 405 and a non-ideality pre-compensation filter module 410. The root-raised cosine filter module 405 may filter incoming streams of symbol-mapped bits (e.g., pulses of high and low voltages) to form the bits into a root-raised cosine shape. This root-raised cosine filter module 405 may reduce the bandwidth of the streams, thereby reducing inter-symbol interference. Additionally or alternatively, other types of pulse-shaping filters may be used, including, but not limited to, boxcar filters, sinc filters, raised-cosine filters, Gaussian filters, and the like.

The non-ideality pre-compensation filter module 410 may filter the streams of symbol-mapped bits in the digital domain to compensate for one or more predicted, determined, or known non-ideal transmission conditions. The non-ideality pre-compensation filter module 410 may receive input regarding chromatic dispersion in the signal path, input regarding timing phase or skew occurring in the signal path, input regarding component channel roll-off in the transmitter or receiver, and input regarding non-linear amplifier response in either the transmitter or the receiver. In other embodiments, input regarding more or fewer non-ideal transmission conditions may be received at the non-ideality pre-compensation filter module 410.

The input received by non-ideality pre-compensation filter module 410 may be used to generate a filtering function in the digital domain which is substantially inverse to a measured, a determined, or a predicted effect of the non-ideal transmission condition(s) to mitigate the detrimental effects of the identified non-ideal transmission conditions. In certain examples, the substantially inverse filtering functions may be pre-programmed or retrievable in memory. Additionally or alternatively, the input may include filter tap coefficients that weight certain aspects of one or more pulse-shaping filters to pre-compensate for the identified non-ideal transmission condition(s). The input may be received directly from an external application or process or statically stored in a register. In certain examples, the input may include active feedback and/or measurements received by one or more components within the signal path of the optical signal. For example, a first device may transmit an optical signal to a second device, and the second device may measure one or more non-ideal transmission conditions based on the received optical signal and transmit the measurements or other feedback based on the measurements back to the first device.

In certain examples, the root-raised cosine filter module 405 and the non-ideality pre-compensation filter module 410 may be implemented by a single discrete filter for each stream of symbol-mapped bits. Alternatively, the symbol-mapped bits may be sequentially filtered by a root-raised cosine filter and a non-ideality pre-compensation filter. In certain examples, the order in which each stream undergoes root-raised cosine filtering and non-ideality pre-compensation filtering may vary. In certain examples, the order of filtering may be dynamically modified to achieve a most favorable result. Moreover, in certain examples, a first stream (e.g., HI stream) of symbol-mapped bits may be passed through root-raised cosine filtering and non-ideality pre-compensation filtering in a different order than a second stream (e.g., VQ stream) of symbol-mapped bits.

The pre-compensation computation module 415 may receive input from an external application, process, or device and/or from one or more registers storing saved or default input regarding non-ideal transmission conditions. The input may be used by the pre-compensation computation module 415 to compute a set of filter tap coefficient values for a discrete pulse-shaping filter implementing at least the non-ideality pre-compensation filter module 410. In certain examples, the pre-compensation computation module 415 may compute the filter tap coefficient values based on a weighted consideration of the totality of the received input. Additionally or alternatively, the pre-compensation computation module 415 may compute the filter tap coefficient values based on a one-to-one correlation between non-ideal transmission conditions and filter tap coefficient values.

Figure 5:
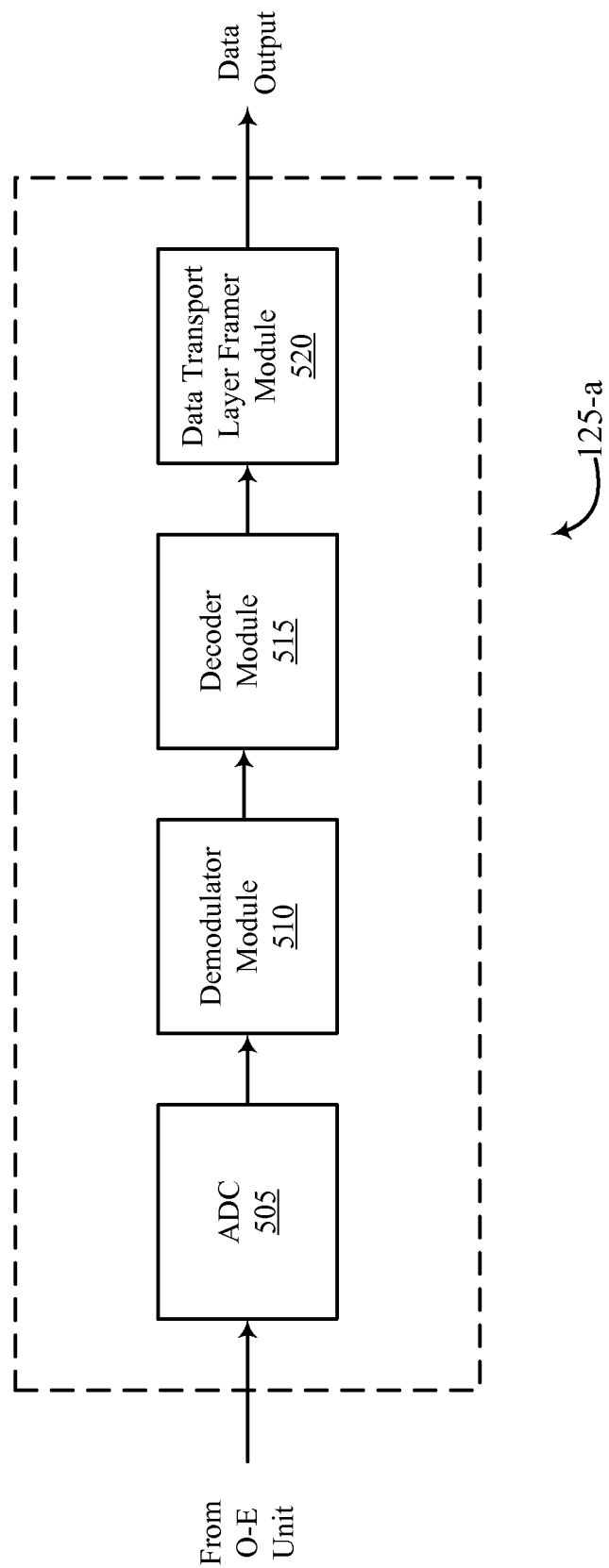
FIG. 5 is a block diagram of an example of a digital demodulation and decoding module according to various embodiments of the principles described herein.

As illustrated in FIG. 5, an example of a digital demodulation and decoding unit 125-a is shown. The digital demodulation and decoding unit 125-a may be an example of the digital demodulation and decoding unit 125 described above with reference to FIG. 1. In this embodiment, the digital demodulation and decoding unit 125-a includes an ADC 505, a demodulator module 510, a decoder module 515, and a data transport layer framer module 520. Each of these components may be in communication, directly or indirectly.

The ADC 505 may sample an electrical and analog version of an optical and analog signal received by an O-E unit (not shown). The optical signal from the E-O unit may have been transmitted at a data transmission rate that is higher than 100 Gbps, for example. Moreover, the optical signal may have been transmitted using an 8-ary modulation scheme such as 8-PSK, DP 8-PSK, or 7-1 PSK. The ADC 505 may provide a digitally sampled version of the optical and analog signal to the demodulator module 510, which demodulates the digitally-sampled signal and provides the demodulated data to the decoder module 515. The decoder module 515 performs FEC decoding on the demodulated data, and may correct transmission errors identified from error-correcting code. The decoder module 515 provides the decoded and corrected data to the data transport layer framer module 520, which frames (or de-frames) the data from the signal according to the particular protocol used in the optical transmission, and provides output data. The data may be output to, for example, a user or any receiving system.

Figure 6:
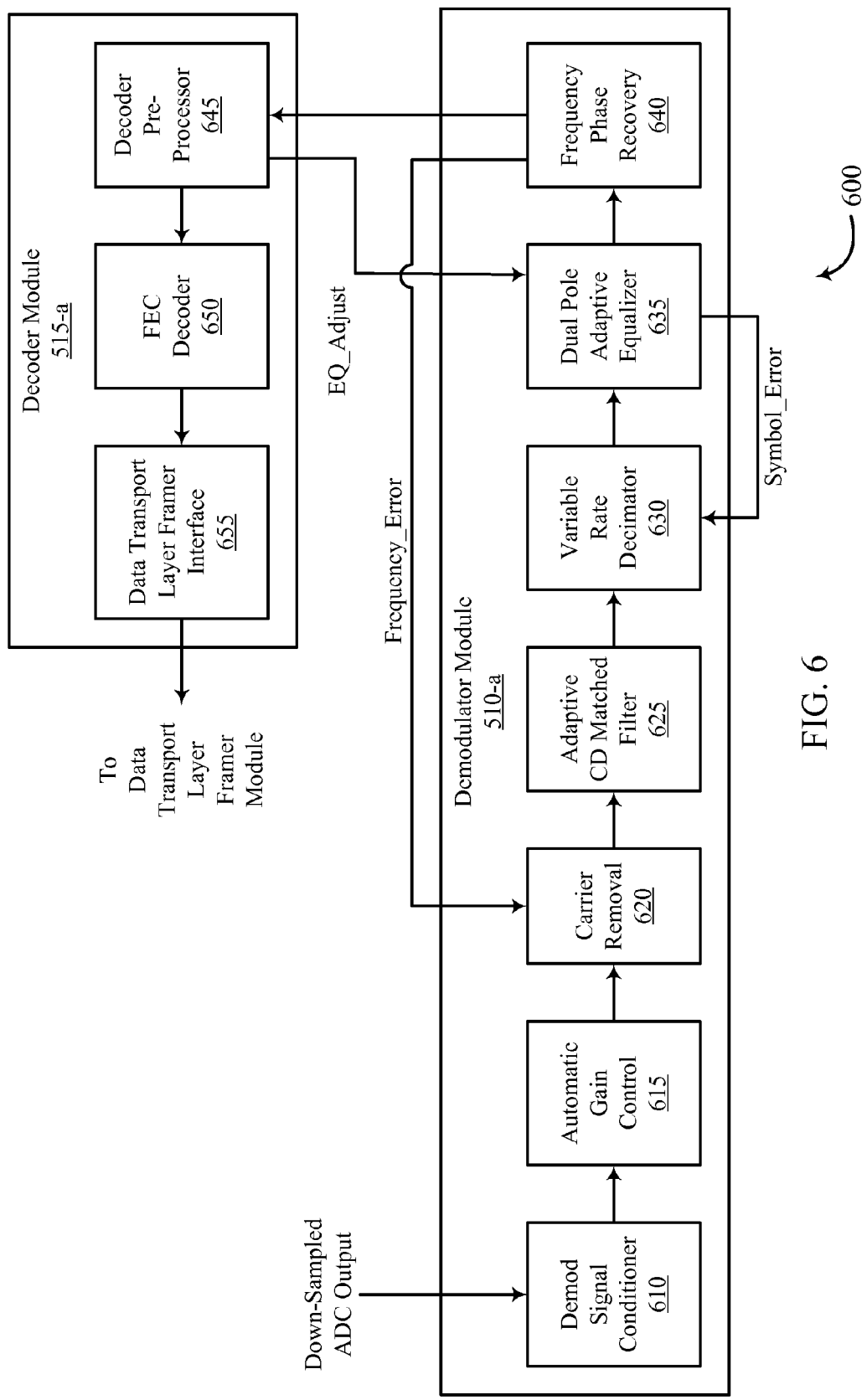
FIG. 6 is a block diagram of an example of a demodulator and a decoder according to various embodiments of the principles described herein.

FIG. 6 is a block diagram of a system 600 that includes a demodulator module 510-a and a decoder module 515-a. Each of these components may be in communication, directly or indirectly. The demodulator module 510-a and the decoder module 515-a may be respective examples of the demodulator module 510 and the decoder module 515 described above with reference to FIG. 5.

The demodulator 510-a may include a demodulator signal conditioner module 610, an automatic gain control module 615, a carrier removal module 620, an adaptive chromatic dispersion (CD) matched filter module 625, a variable rate decimator 630, a dual pole adaptive equalizer module 635, and a frequency phase recovery module 640.

Through the use of pulse-shaping to reduce inter-symbol interference and the effects of non-ideal transmission conditions, it may be possible to perform some of the filtering and other preliminary demodulation steps on a version of the optical signal that is sampled at or near the baud rate (e.g., the symbol rate) of the optical signal. However, an ADC that samples the optical signal at a rate of twice the symbol rate may be more readily obtainable and less expensive than an ADC that samples at or near the baud rate of the optical signal. Therefore, in some embodiments, an ADC that samples at twice the symbol rate may be used, and the output of the ADC may be down-sampled to just over the baud rate of the optical signal (e.g., between 1.0 and 1.3 times the baud rate).

The demodulator signal conditioner module 610 may receive the down-sampled version from the ADC and perform preliminary filtering on the received sampled version of the optical signal. The automatic gain control module 615 may automatically adjust the gain of the down-sampled version of the optical signal to bring the amplitude of the modulated carrier wave into an acceptable range. The carrier removal module 620 may then extract the symbol-mapped bits from the carrier frequency according to the modulation scheme used in the optical signal. The adaptive CD matched filter 625 may filter the symbol-mapped bits to compensate for chromatic dispersion in the optical transmission path. In certain examples, the adaptive CD matched filter 625 may match one or more filters in the modulator of the device transmitting the optical signals.

The variable rate decimator module 630 may adjust the sampling rate of the symbol-mapped bits such that each stream of symbol-mapped bits is at a sampling rate that will allow for minimal inter-symbol interference during equalization. In certain cases, the variable rate decimator module 630 may up-sample the extracted and filtered symbol-mapped bits to the original sample rate of the ADC (e.g., twice the symbol rate). The dual pole adaptive equalizer module 635 performs additional filtering on the streams of symbol-mapped bits in the digital domain to reduce inter-symbol interference and allow for the recovery of the modulated data. The dual pole adaptive equalizer module 635 may perform an inverse or matched filtering function of one or more pulse-shaping filters in the transmitter. The dual pole adaptive equalizer module 635 may be configured to support one or more polarizations in the modulation scheme. After equalization is performed, the frequency phase recovery module 640 may recover the encoded bits based on symbols representing changes in the phase of the modulated carrier frequency. The encoded bits may be recovered from the symbols using information about the constellation diagram that is representative of the 8-ary modulation scheme used to transmit the optical signal. In some embodiments, additional or separate modules may be used as appropriate to demodulate the encoded data from the recovered symbols.

The decoder module 515-*a* of the present example includes a decoder pre-processor module 645, an FEC decoder module 650, and a data transport layer framer interface module 655. Each of these components may be in communication, directly or indirectly.

The decoder pre-processor module 645 may enforce a set of rules to ensure the integrity and validity of the encoded data received from the demodulator module 510-*a*. The FEC decoder module 650 may perform forward error correction on the encoded bits to identify and correct errors and reconstruct the originally transmitted stream of data. The FEC decoder module 650 may support one or more decoding techniques such as TPC decoding and LDPC decoding, for example. The data transport layer framer interface 655 may forward the originally transmitted stream of data to a data transport layer framer for processing and delivery.

Figure 7:
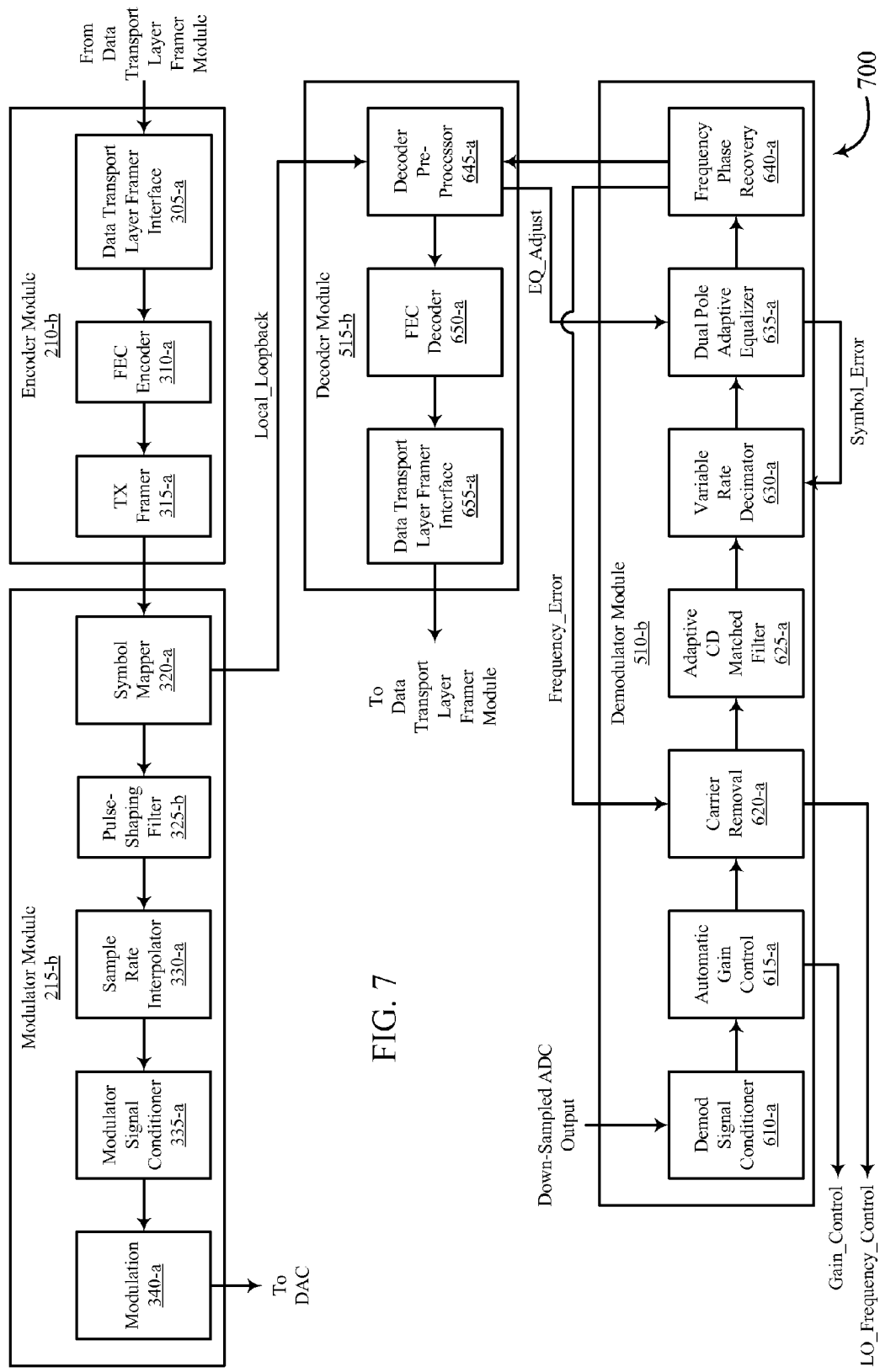
FIG. 7 is a block diagram of an example of an optical modem according to various embodiments of the principles described herein.

FIG. 7 illustrates a block diagram of an example of a modem device 700. The modem 700 includes an encoder module 210-*b*, a modulator module 215-*b*, a demodulator module 510-*b*, and a decoder module 515-*b*. The encoder module 210-*b* may be an example of the encoder modules 210 and 210-*a* described above with reference to FIG. 2 and FIG. 3, respectively. The modulator module 215-*b* may be an example of the modulator modules 215 and 215-*a* described above with reference to FIG. 2 and FIG. 3, respectively. The demodulator module 510-*b* may be an example of the demodulator modules 510 and 510-*a* described above with reference to FIG. 5 and FIG. 6, respectively. The decoder module 515-*b* may be an example of the decoder modules 515 and 515-*a* described above with reference to FIG. 5 and FIG. 6, respectively.

The encoder module 210-*b* may include a data transport layer framer interface module 305-*a*, an FEC encoder module 310-*a*, and a TX framer module 315-*a*. These components may be examples of the data transport layer framer interface module 305, the FEC encoder module 310, and the TX framer module 315 described above with reference to FIG. 3. The modulator module 215-*b* may include a symbol mapper module 320-*a*, a pulse-shaping filter module 325-*b*, a sample rate interpolator module 330-*a*, a modulator signal conditioner module 335-*a*, and a modulation module 340-*a*. These components may be examples of the symbol mapper module 320, the pulse-shaping filter module 325, the sample rate interpolator module 330, the modulator signal conditioner 335, and the modulation module described above with reference to FIG. 3. Additionally, the pulse-shaping filter 325-*b* may be an example of the pulse-shaping filter 325-*a* described above with reference to FIG. 4.

The demodulator module 510-*b* of the example in FIG. 7 may include a demodulator signal conditioner module 610-*a*, an automatic gain control module 615-*a*, a carrier removal module 620-*a*, an adaptive CD matched filter module 625-*a*, a variable rate decimator module 630-*a*, a dual pole adaptive equalizer module 635-*a*, and a frequency phase recovery module 640-*a*. These components may be examples of the demodulator signal conditioner module 610, the automatic gain control module 615, the carrier removal module 620, the adaptive CD matched filter module 625, the variable rate decimator module 630, the dual pole adaptive equalizer module 635, and the frequency phase recovery module 640 described above with reference to FIG. 6.

The decoder module 515-*b* may include a decoder pre-processor module 645-*a*, an FEC decoder module 650-*a*, and a data transport layer framer interface 655-*a*. These components may be examples of the decoder pre-processor module 645, the FEC decoder module 650, and the data transport layer framer interface module 655 described above with reference to FIG. 6.

As shown in FIG. 7, components of the modulator module 215-*b*, the decoder module 515-*b*, and the demodulator module 510-*b* may interact with each other. For example, the symbol mapper module 320-*a* of the modulator module 215-*b* may provide local loopback feedback signal (Local_Loopback) to the decoder pre-processor module 645-*a* to increase the accuracy of the decoder pre-processor module 645-*a*. The decoder pre-processor module 645-*a* may provide an equalizer adjustment feedback signal (EQ_Adjust) to the dual pole adaptive equalizer 635-*a* of the demodulator 510-*b* to dynamically adjust the equalization filtering at the demodulator module 510-*c*.

The frequency phase recovery module 640-*a* of the demodulator module 510-*b* may provide a frequency error signal (Frequency_Error) to the carrier removal module 620-*a* to allow the carrier removal module 620-*a* to achieve frequency lock with the carrier frequency. The dual pole adaptive equalizer module 635-*a* may provide a symbol error feedback signal (Symbol_Error) to the variable rate decimator module 630-*a* to allow the variable rate decimator module 630-*a* to dynamically adjust the sampling rate and reduce inter-symbol interference. The carrier removal module 620-*a* may provide a local oscillator frequency control signal (LO_Frequency_Control) to correct the frequency of a local oscillator signal that is used to demodulate the received optical signal. Additionally, the automatic gain control 615-*a* may provide a gain control signal (Gain_Control) that is based on the gain being applied to the amplitude of the modulated carrier wave.

Figure 8A:
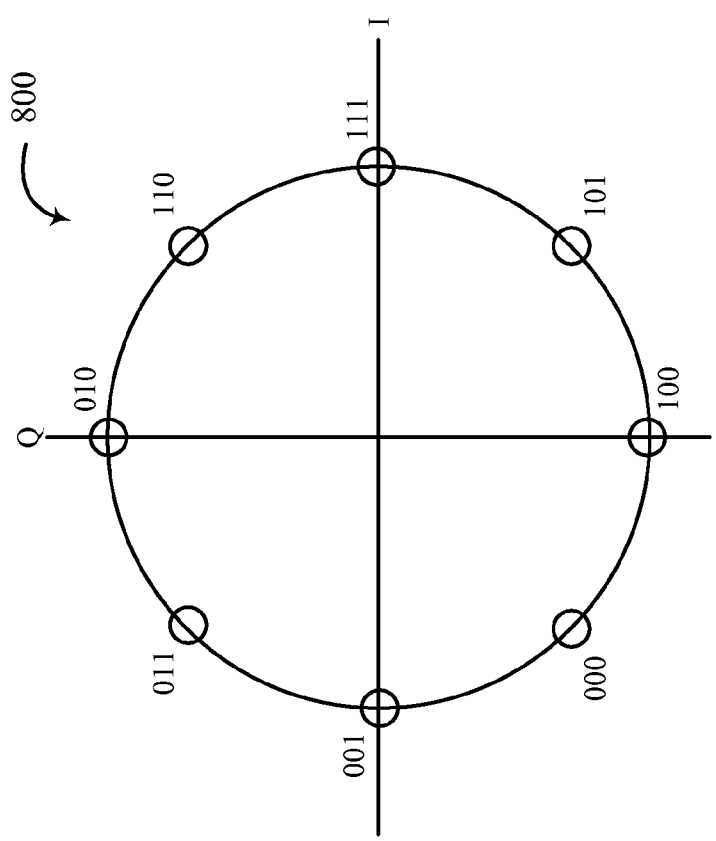
FIG. 8A is a diagram that illustrates an example of an 8 Phase-Shift Keying constellation according to various embodiments of the principles described herein.

FIG. 8A illustrates an example of a constellation diagram for an 8-PSK modulation scheme that may be used to enable higher OTN data transmission rates. The constellation diagram 800 represents a typical 8-PSK modulation scheme in which eight symbols are equally spaced on a circle that is centered at the origin of a complex plane defined by a quadrature (Q)-axis and an in-phase (I)-axis. There are three bits mapped to each symbol and the symbols are Gray-coded such that only one bit changes between adjacent symbols. The symbols corresponding to the triplets (111) and (001) are located on the I-axis, while the symbols corresponding to the triplets (010) and (100) are located on the Q-axis. The symbols corresponding to the remaining triplets (110), (011), (000), and (101) are respectively located on the circle at 45°, 135°, 225°, and 315° relative to the positive I-axis.

Figure 8C:
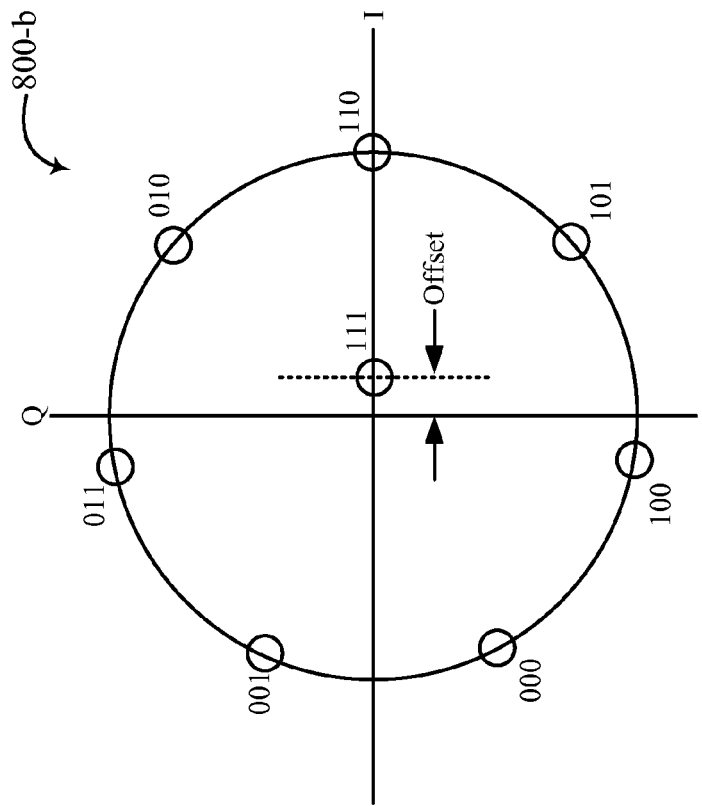
FIG. 8B and FIG. 8C are diagrams that illustrate examples of 7-1 Phase-Shift Keying constellations according to various embodiments of the principles described herein.
Figure 8B:
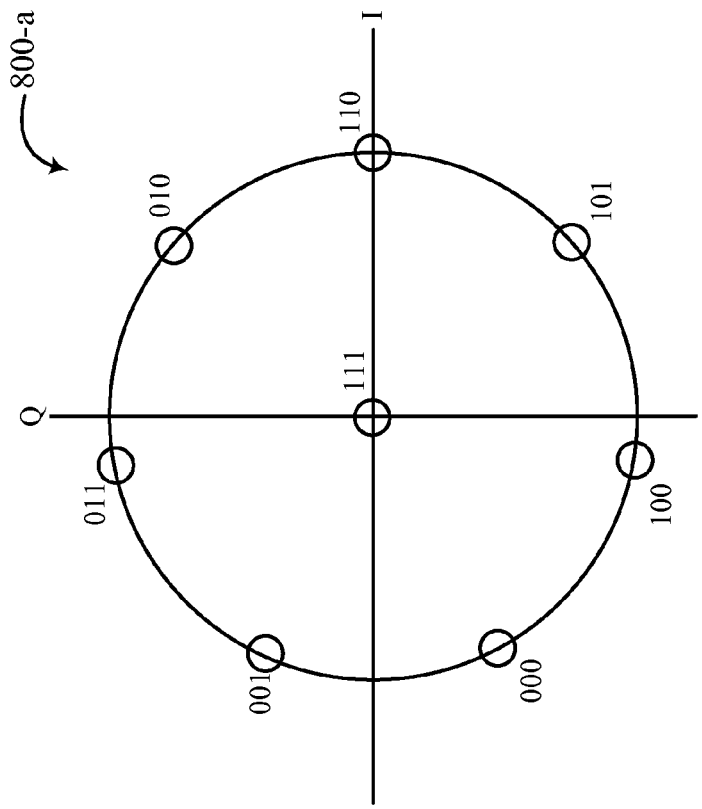

FIG. 8B illustrates an example of a constellation diagram for a 7-1 PSK modulation scheme that may be used to enable higher OTN data transmission rates. The constellation diagram 800-a represents a first type of 7-1 PSK modulation scheme in which one symbol is at the origin of the complex plane. In the example shown in FIG. 8B, the symbol corresponding to the triplet (111) is at the origin of the complex plane, while the other symbols are equally spaced on a circle that is centered at the origin. The symbol at the origin may provide more phase spacing between itself and the other symbols. In some embodiments, the symbol at the origin of the complex plane may be a different symbol, that is, one that does not correspond to the triplet (111). Moreover, the example shown in FIG. 8B illustrates one way in which the symbols that are not at the origin may be equally spaced on the circle. Other arrangements in which the symbols are at different points in the circle but remain equally spaced may also be used.

FIG. 8C illustrates an example of a constellation diagram for another 7-1 PSK modulation scheme that may be used to enable higher OTN data transmission rates. The constellation diagram 800-b represents a second type of 7-1 PSK modulation scheme in which one symbol is on the I-axis near the origin of the complex plane. In the example shown in FIG. 8C, the symbol corresponding to the triplet (111) is on the I-axis, slightly offset from the Q-axis or from the origin of the complex plane. The other symbols are equally spaced on a circle that is centered at the origin. The symbol near the origin may provide more phase spacing between itself and the other symbols. The offset may be determined to provide an optimal or desirable amount of phase separation between symbols for particular applications or situations. In some embodiments, the symbol near the origin does not lie along the I-axis but instead lies along the Q-axis and is offset from the I-axis. In other embodiments, the symbol near the origin does not lie along either the I-axis or the Q-axis but instead is offset from both axes. In some embodiments, the symbol near the origin of the complex plane may be a different symbol, that is, one that does not correspond to the triplet (111). Moreover, the example shown in FIG. 8C illustrates one way in which the symbols that are not at the origin may be equally spaced on the circle. Other arrangements in which the symbols are at different points in the circle but remain equally spaced may also be used.

The constellation diagrams 800-a and 800-b are provided to illustrate examples of different types of 7-1 PSK modulation schemes. As noted above, some modifications and variations to the location of one or more of symbols in the constellation diagrams 800-a and 800-b may provide for other types of 7-1 PSK modulation schemes according to various other embodiments.

The constellation diagrams 800, 800-a, and 800-b may be used when polarizing and multiplexing two different 8-ary modulated signals to produce a dual polarization 8-ary modulation scheme. For example, the constellation diagram 800 may be used to implement DP 8-PSK modulation, while the constellation diagrams 800-a and 800-b may be used to implement a dual polarization 7-1 PSK. Multiple polarizations may improve the spectral efficiency of the modulation scheme.

The constellation diagrams 800, 800-a, and 800-b may be used by the modulator modules 215 and 215a described above with reference to FIG. 2 and FIG. 3, respectively, to map bits (e.g., encoded bits) to symbols. The waveforms modulated with the symbol-mapped bits produced by the modulator modules 215 and 215-a may be filtered by the DACs that convert the waveforms to the analog domain for optical transmission. These converted waveforms may have larger bandwidths than the bandwidth produced by higher-order modulation schemes (e.g., 16-ary), which enables an OTN to use the lower-order 8-ary modulation schemes to provide high data transmission rates. The constellation diagrams 800, 800-a, and 800-b may also be used by the demodulator modules 510 and 510-a described above with reference to FIG. 5 and FIG. 6, respectively, to recover bits (e.g., encoded bits) from symbols.

Figure 9A:
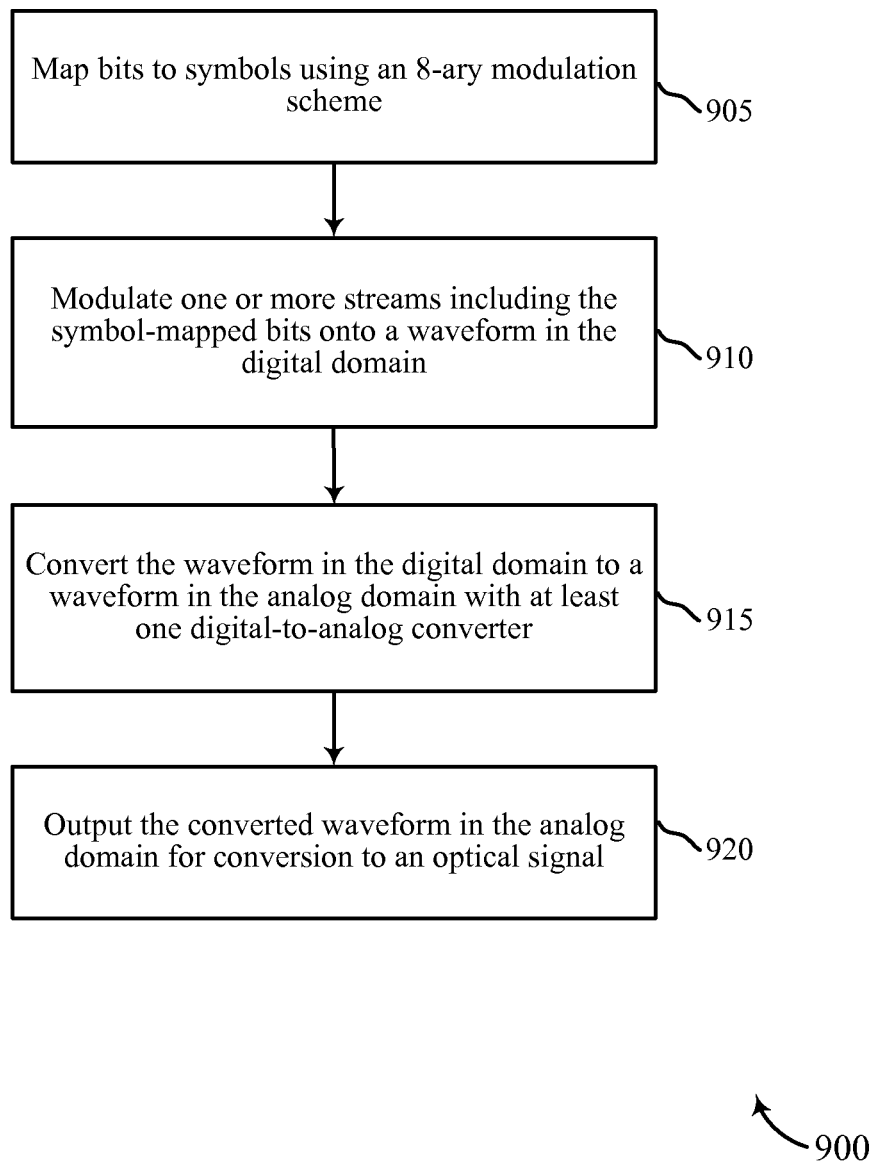
FIG. 9A is a flow chart of an example of a method for modulating data for optical transmissions according to various embodiments of the principles described herein.

FIG. 9A illustrates a flowchart diagram of an example method 900 of modulating data for optical transmissions. The method 900 may be performed using, for example, the digital coding and modulation units 105 and 105-a of FIG. 1 and FIG. 2, respectively; the modulator modules 215, 215-a, and 215-b of FIG. 2, FIG. 3, and FIG. 7, respectively; the DAC 220 of FIG. 2; and/or the modem of FIG. 7.

At block 905, bits are mapped to symbols using an 8-ary modulation scheme. The 8-ary modulation scheme may be one of a 8-PSK modulation scheme, a DP 8-PSK modulation scheme, and a 7-1 PSK modulation scheme. Examples of the type of constellation diagrams used by these 8-ary modulations schemes are illustrated in FIGS. 8A-8C. At block 910, one or more streams that include the symbol-mapped bits are modulated onto a waveform in the digital domain. At block 915, the waveform in the digital domain is converted to a waveform in the analog domain with at least one DAC (e.g., DAC 220). At block 920, the waveform that has been converted to the analog domain is output for conversion to an optical signal. The conversion to an optical signal may be performed by an E-O unit (e.g., E-O unit 110).

In some embodiments of the method 900, the converted waveform in the analog domain is output at a data rate of about 200 Gbps for conversion to the optical signal. The at least one DAC that converts the waveform to the analog domain may provide filtering that allows the converted waveform's bandwidth to be larger than the bandwidth produced by a higher-order modulation scheme. The increased bandwidth of the converted waveform in the analog domain remains within the 50 GHz channel spacing of a typical WDM system. In some embodiments, outputting the converted waveform in the analog domain at a data rate of about 200 Gigabits-per-second for conversion to the optical signal also includes having the optical signal transmitted via a link that supports legacy data rates of 100 Gigabits-per-second or lower.

Figure 9B:
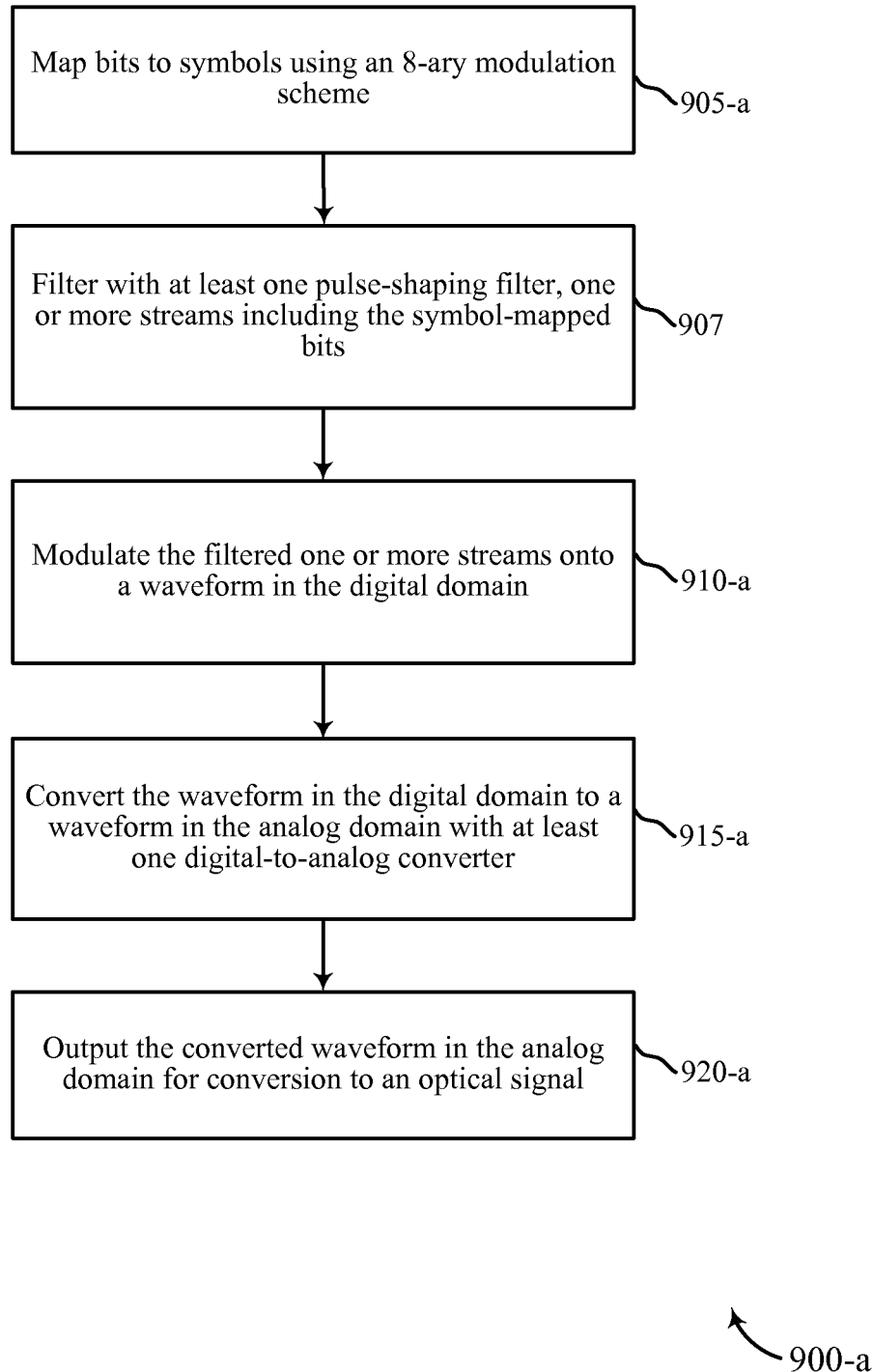
FIG. 9B is a flow chart of another example of a method for modulating data for optical transmissions according to various embodiments of the principles described herein.

FIG. 9B illustrates a flowchart diagram of an example method 900-a of modulating data for optical transmissions. The method 900-a, like the method 900 above, may be performed using, for example, the digital coding and modulation units 105 and 105-a of FIG. 1 and FIG. 2, respectively; the modulator modules 215, 215-a, and 215-b of FIG. 2, FIG. 3, and FIG. 7, respectively; the DAC 220 of FIG. 2; and/or the modem of FIG. 7.

At block 905-a, bits are mapped to symbols using an 8-ary modulation scheme. The 8-ary modulation scheme may be one of a 8-PSK modulation scheme, a DP 8-PSK modulation scheme, and a 7-1 PSK modulation scheme. Examples of the type of constellation diagrams used by these 8-ary modulations schemes are illustrated in FIGS. 8A-8C. At block 907, one or more streams that include the symbol-mapped bits are filtered with at least one pulse-shaping filter. The pulse-shaping filter may adjust the bandwidth of the streams and may pre-compensate for non-ideal conditions occurring during the modulation, transmission, and/or demodulation of data. The pulse-shaping filter may include a root-raised cosine filter, for example.

At block 910-a, the filtered one or more streams are modulated onto a waveform in the digital domain. At block 915-a, the waveform in the digital domain is converted to a waveform in the analog domain with at least one DAC (e.g., DAC 220). At block 920-a, the waveform that has been converted to the analog domain is output for conversion to an optical signal. The conversion to an optical signal may be performed by an E-O unit (e.g., E-O unit 110).

Figure 10A:
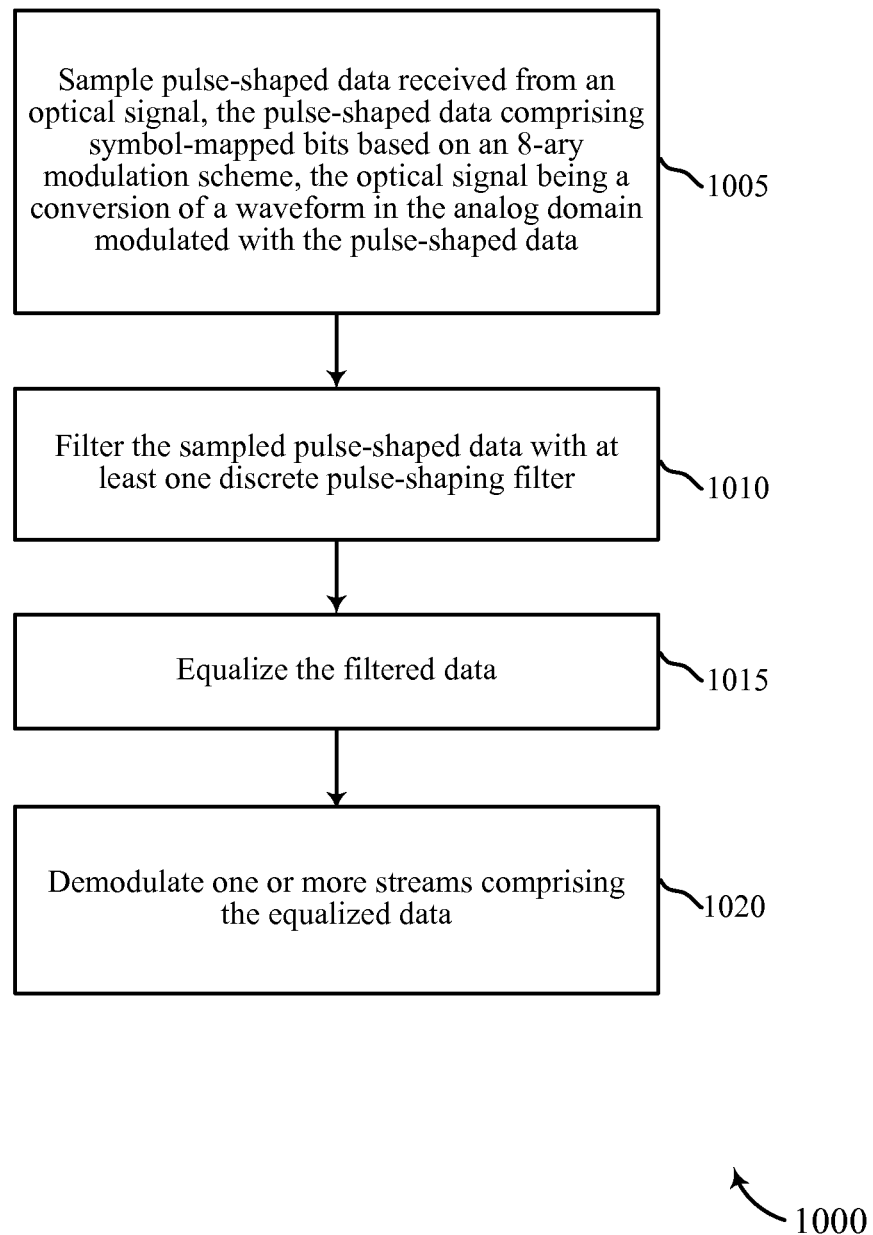
FIG. 10A is a flow chart of an example of a method for demodulating data from optical transmissions according to various embodiments of the principles described herein.

FIG. 10A illustrates a flowchart diagram of an example method 1000 of demodulating data from optical transmissions. The method 1000 may be performed using, for example, the digital demodulation and decoding units 125 and 125-a of FIG. 1 and FIG. 5, respectively; the demodulator modules 510, 510-a, and 510-b of FIG. 5, FIG. 6, and FIG. 7, respectively; the ADC 505 of FIG. 5; and/or the modem of FIG. 7.

At block 1005, pulse-shaped data received from an optical signal is sampled. The pulse-shaped data includes symbol-mapped bits based on an 8-ary modulation scheme. The optical signal may be an optical conversion of a waveform in the analog domain that is modulated with the pulse-shaped data. The 8-ary modulation scheme may be one of a 8-PSK modulation scheme, a DP 8-PSK modulation scheme, and a 7-1 PSK modulation scheme. Examples of the type of constellation diagrams used by these 8-ary modulations schemes are illustrated in FIGS. 8A-8C. The sampling of the pulse-shaped data may be performed with at least one ADC (e.g., ADC 505).

At block 1010, the sampled pulse-shaped data is filtered with at least one discrete pulse-shaping filter. The at least one discrete pulse-shaping filter may include a root-raised cosine filter. At block 1015, the filtered data is equalized. The equalization may be performed by the dual pole adaptive equalizers 635 and 635-a of FIG. 6 and FIG. 7, respectively. At block 1020, one or more streams that include the equalized data are demodulated.

Figure 10B:
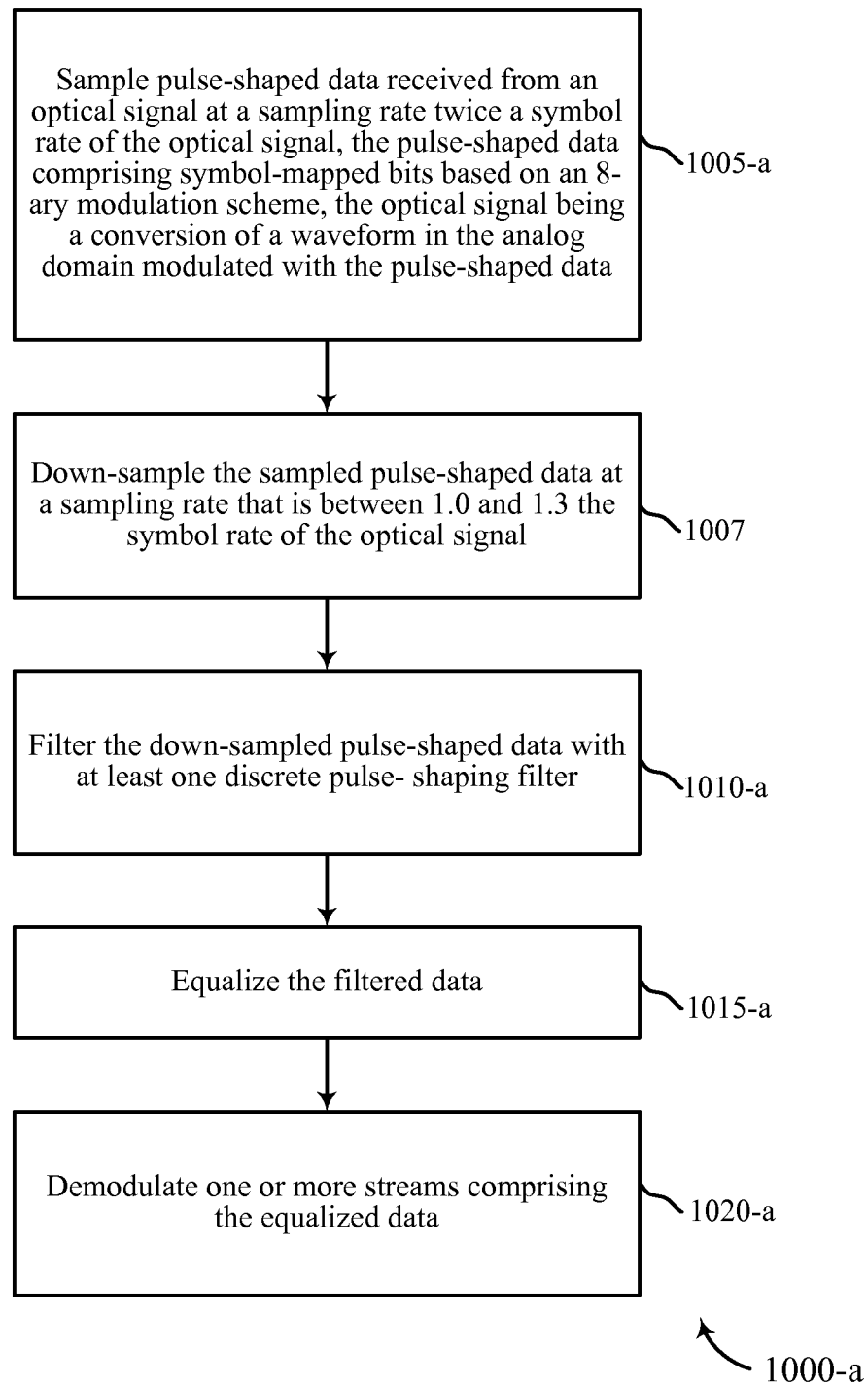
FIG. 10B is a flow chart of another example of a method for demodulating data from optical transmissions according to various embodiments of the principles described herein.

FIG. 10B illustrates a flowchart diagram of an example method 1000-a of demodulating data from an optical transmission. The method 1000-a, like the method 1000 above, may be performed using, for example, the digital demodulation and decoding units 125 and 125-a of FIG. 1 and FIG. 5, respectively; the demodulator modules 510, 510-a, and 510-b of FIG. 5, FIG. 6, and FIG. 7, respectively; the ADC 505 of FIG. 5; and/or the modem of FIG. 7.

At block 1005-a, pulse-shaped data received from an optical signal is sampled. The pulse-shaped data includes symbol-mapped bits based on an 8-ary modulation scheme. The optical signal may be an optical conversion of a waveform in the analog domain that is modulated with the pulse-shaped data. The 8-ary modulation scheme may be one of a 8-PSK modulation scheme, a DP 8-PSK modulation scheme, and a 7-1 PSK modulation scheme. Examples of the type of constellation diagrams used by these 8-ary modulations schemes are illustrated in FIGS. 8A-8C. The sampling of the pulse-shaped data may be performed with at least one ADC (e.g., ADC 505). In some embodiments, the pulse-shaped data is sampled at twice the symbol rate of the optical signal by the at least one ADC.

At block 1007, the sampled pulse-shaped data is down-sampled at a sampling rate that is between 1.0 and 1.3 the symbol rate of the optical signal. At block 1010-a, the down-sampled pulse-shaped data is filtered with at least one discrete pulse-shaping filter. The at least one discrete pulse-shaping filter may include a root-raised cosine filter. At block 1015-a, the filtered data is equalized. The equalization may be performed by the dual pole adaptive equalizers 635 and 635-a of FIG. 6 and FIG. 7, respectively. At block 1020-a, one or more streams that include the equalized data are demodulated.

In some embodiments, a system for modulating data for optical transmissions includes means for mapping bits to symbols using an 8-ary modulation scheme. The means may include, but need not be limited to, a symbol mapper as illustrated in FIG. 3 and/or FIG. 7, for example. The system may also include means for modulating one or more streams comprising the symbol-mapped bits onto a waveform in the digital domain. The means may include, but need not be limited to, a modulation module as illustrated in FIG. 3 and/or FIG. 7, for example. The system may further include means for converting the waveform in the digital domain to a waveform in the analog domain. The means may include, but need not be limited to, a DAC as illustrated in FIG. 2, for example. The system may also include means for outputting the converted waveform in the analog domain for conversion to an optical signal. The means may include, but need not be limited to, a DAC as illustrated in FIG. 2, for example.

The means for mapping bits to symbols using the 8-ary modulation scheme may include means for using an 8-PSK modulation scheme as the 8-ary modulation scheme. The means may include, but need not be limited to, a symbol mapper as illustrated in FIG. 3 and/or FIG. 7, for example. The means for mapping bits to symbols using the 8-ary modulation schemer may include means for using a Dual-Polarization 8-PSK modulation scheme as the 8-ary modulation scheme. The means may include, but need not be limited to, a symbol mapper as illustrated in FIG. 3 and/or FIG. 7, for example. Moreover, the means for mapping bits to symbols using the 8-ary modulation schemer may include means for using a 7-1 PSK modulation scheme based on a constellation with one symbol at an origin of a complex plane or based on a constellation with one symbol offset from the origin of the complex plane along an in-phase axis. The means may include, but need not be limited to, a symbol mapper as illustrated in FIG. 3 and/or FIG. 7, for example.

While the various embodiments and examples described above have been illustrated with reference to optical communication systems that use fiber optic cables as a data transmission medium or path, those embodiments and examples may also be applicable to systems in which communications occur through other types of transmission media or paths. For example, some or all of the embodiments and examples described above may be applicable to communications through free space or similar media in which electromagnetic signals are radiated, such as cellular communications, point-to-point communications, and satellite communications, to name a few.

As will be readily understood, the components and modules described with reference to various embodiments above may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the principles described herein.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the principles described herein. For example, the above elements may merely be a component of a larger system, wherein other rules may take precedence over or otherwise modify the application of the principles described herein. Also, a number of steps may be undertaken before, during, or after the above elements are considered. Accordingly, the above description should not be taken as limiting the scope of the invention.

What is claimed is:

1. A method of modulating data, comprising: mapping a number of bits to a set of symbols according to a modulation schemes wherein the set of symbols has an integer number of symbols equal to two to the power of the number of bits, and wherein the modulation scheme has the integer number minus one of the set of symbols equally spaced on a circle centered at an origin of a complex plane and a single symbol inside the circle, the single symbol offset from the origin of the complex plane; modulating one or more streams comprising the number of symbol-mapped bits onto a waveform in the digital domain; converting the waveform in the digital domain to a waveform in the analog domain; and outputting the converted waveform in the analog domain.

2. The method of claim 1, wherein the single symbol is offset from the origin of the complex plane along an in-phase axis.

3. The method of claim 1, wherein the single symbol is offset from the origin of the complex plane along a quadrature axis.

4. The method of claim 1, wherein the single symbol is offset from both an in-phase axis and a quadrature axis of the complex plane.

5. The method of claim 1, wherein one of the two to the power of the number of bits minus one of the set of symbols is located on an in-phase axis.

6. The method of claim 1, wherein the single symbol has a same phase as one of the two to the power of the number of bits minus one of the set of symbols.

7. The method of claim 1, further comprising: filtering, at baseband, the one or more streams with at least one discrete pulse-shaping filter.

8. The method of claim 1, wherein the modulation scheme comprises a 7-1 PSK modulation scheme.

9. A transmitter device, comprising: a symbol mapper that maps a number of bits to a set of symbols according to a modulation scheme, wherein the set of symbols has an integer number of symbols equal to two to the power of the number of bits, and wherein the modulation scheme has the integer number minus one of the set of symbols equally spaced on a circle centered at an origin of a complex plane and a single symbol inside the circle, the single symbol offset from the origin of the complex plane; a modulator that modulates one or more streams comprising the number of symbol-mapped bits onto a waveform in the digital domain; a digital to analog converter that converts the waveform in the digital domain to a waveform in the analog domain; and a transmitter that outputs the converted waveform in the analog domain.

10. The transmitter device of claim 9, wherein the single symbol is offset from an in-phase axis of the complex plane, offset from a quadrature axis of the complex plane, or offset from both the in-phase axis and the quadrature axis.

11. The transmitter device of claim 9, wherein one of the two to the power of the number of bits minus one of the set of symbols is located on an in-phase axis.

12. The transmitter device of claim 9, wherein the single symbol has a same phase as one of the two to the power of the number of bits minus one of the set of symbols.

13. The transmitter device of claim 9, further comprising: a discrete pulse-shaping filter configured to filter, at baseband, the one or more streams comprising the number of symbol-mapped bits.

14. The transmitter device of claim 9, wherein the modulation scheme comprises a 7-1 PSK modulation scheme.

15. A transmitter apparatus, comprising: means for mapping a number of bits to a set of symbols according to a modulation scheme, wherein the set of symbols has an integer number of symbols equal to two to the power of the number of bits, and wherein the modulation scheme has the integer number minus one of the set of symbols equally spaced on a circle centered at an origin of a complex plane and a single symbol inside the circle, the single symbol offset from the origin of the complex plane; means for modulating one or more streams comprising, the number of symbol-mapped bits onto a waveform in the digital domain; means for converting the waveform in the digital domain to a waveform in the analog domain; and means for outputting the converted waveform in the analog domain.

16. A method for demodulating a signal, comprising: sampling the signal to obtain sampled data; and demodulating the sampled data to obtain one or more data streams, the sampled data comprising a number of symbol-mapped bits mapped to a set of symbols according to a modulation scheme, wherein the set of symbols has an integer number of symbols equal to two to the power of the number of symbol-mapped bits, and wherein the modulation scheme has the integer number minus one of the set of symbols equally spaced on a circle centered at an origin of a complex plane and a single symbol inside the circle, the single symbol offset from the origin of the complex plane.

17. The method of claim 16, further comprising: filtering the sampled data with at least one discrete pulse-shaping filter; and equalizing the filtered sampled data prior to the demodulating.

18. The method of claim 16, wherein the single symbol is offset from an in-phase axis of the complex plane, offset from a quadrature axis of the complex plane, or offset from both the in-phase axis and the quadrature axis.

19. The method of claim 16, wherein one of the two to the power of the number of symbol-mapped bits minus one of the set of symbols is located on an in-phase axis.

20. The method of claim 16, wherein the single symbol has a same phase as one of the two to the power of the number of symbol-mapped bits minus one of the set of symbols.

21. A receiver device, comprising: an analog to digital converter that samples a signal to obtain sampled data; a demodulator that demodulates the sampled data to obtain one or more data streams, the sampled data comprising a number of symbol-mapped bits mapped to a set of symbols according to a modulation scheme, wherein the set of symbols has an integer number of symbols equal to two to the power of the number of symbol-mapped bits, and wherein the modulation scheme has the integer number minus one of the set of symbols equally spaced on a circle centered at an origin of a complex plane and a single symbol inside the circle, the single symbol offset from the origin of the complex plane.

22. The receiver device of claim 21, further comprising: a discrete pulse-shaping filter that filters the sampled data; and an equalizer that equalizes the filtered sampled data.

23. The receiver device of claim 21, wherein the single symbol is offset from an in-phase axis of the complex plane, offset from a quadrature axis of the complex plane, or offset from both the in-phase axis and the quadrature axis.

24. The receiver device of claim 21, wherein one of the two to the power of the number of symbol-mapped bits minus one of the set of symbols is located on an in-phase axis.

25. The receiver device of claim 21, wherein the single symbol has a same phase as one of the two to the power of the number of symbol-mapped bits minus one of the set of symbols.

26. A receiver apparatus, comprising: means for sampling a signal to obtain sampled data; and means for demodulating the sampled data to obtain one or more data streams, the sampled data comprising a number of symbol-mapped bits mapped to a set of symbols according to a modulation scheme, wherein the set of symbols has an integer number of symbols equal to two to the power of the number of symbol-mapped bits, and wherein the modulation scheme has the integer number minus one of the set of symbols equally spaced on a circle centered at an origin of a complex plane and a single symbol inside the circle, the single symbol offset from the origin of the complex plane.

* * * * *